United States Patent [19]

Rotman

[11] 4,302,873

[45] Dec. 1, 1981

[54] WHEEL DISLODGING TOOL

[76] Inventor: Morris Rotman, 20 S. Newark Ave., Ventnor, N.J. 08406

[21] Appl. No.: 152,106

[22] Filed: May 21, 1980

[51] Int. Cl.$^3$ .............................................. B23P 19/04

[52] U.S. Cl. ......................................... 29/259; 29/273

[58] Field of Search .................. 29/271, 273, 258-262, 29/256, 270

[56] References Cited

U.S. PATENT DOCUMENTS

| | | | |
|---|---|---|---|
| 1,426,835 | 8/1922 | Mohrman | 29/259 |
| 1,434,852 | 11/1922 | Sonnenburg | 29/259 |
| 1,969,233 | 8/1934 | Patterson | 29/273 |
| 3,846,898 | 11/1974 | Kerr | 29/256 |

*Primary Examiner*—Robert C. Watson
*Attorney, Agent, or Firm*—Thomas C. Naber

[57] ABSTRACT

A dislodging tool for dislodging a mounted wheel from a drum of a vehicle. The tool comprises, firstly, a base member having one end internally threaded to be threadably engageable and rotatable on a drum stud projecting through a stud hole of a wheel mounted on the drum. Secondly, the tool comprises a collar member having at least one ear element extending laterally therefrom, the collar member being slideable onto the base member and retainable thereon. Thirdly, the tool comprises a bar member for each ear element of the collar member, the bar member being passable through an opening in a mounted wheel and having at one end thereof a hook to engage the outer lip of the inside surface of said mounted wheel, with the bar member being mountable on the ear element. Relatedly provided is a dislodging and dismounting tool for dislodging and dismounting a mounted wheel from a drum of a vehicle. The tool comprises the members of the dislodging tool plus an angled, cylindrically-shaped dismounting member on which the wall of a stud hole of the wheel can ride during removal of the wheel.

3 Claims, 7 Drawing Figures

WHEEL DISLODGING TOOL

BACKGROUND OF THE INVENTION

This invention relates to a dislodging tool for dislodging a mounted wheel from a drum of a vehicle.

After several thousand miles of travel on various types of roads and highways and under various weather conditions, wheels, and especially those mounted on large trucks, tend to become lodged on the studs and drums on which they are mounted. This lodging is caused by road oil, dirt, water, and other minute debris becoming deposited on and around the interfaces of the wheel and the studs and drum. Over a period of time this collection of materials creates an adhesive bond which is quite strong and results in great difficulty for removal of the wheel when, for example, a flat tire occurs and the wheel must be removed. It is reported that the generally-used approach by truck drivers and mechanics in breaking this bond is the use of a sledge hammer struck a multiple number of times against the wheel until the bond is broken. Such an approach, however, is both dangerous and possibly destructive.

U.S. Pat. No. 1,260,369 to Goddard, U.S. Pat. No. 1,534,350 to Bassett, U.S. Pat. No. 1,589,015 to Lee, U.S. Pat. No. 1,594,468 to Riberdy, U.S. Pat. No. 2,191,021 to Ladd, U.S. Pat. No. 2,296,119 to Ringrose, and U.S. Pat. No. 3,402,455 to Converse all disclose puller apparatus for removing various types of vehicle as well as non-vehicle wheels. However, each works on the principle of applying progressively increased pressure as with the end of a screw member progressively screwed against the central axle of a wheel as pre-positioned outwardly moving lever means engaging some part of the wheel act to pull said wheel outwardly. These types of apparatus are, first of all, rather cumbersome since they must be engaged with a central axle and with the wheel, thus requiring a large piece of apparatus should the wheel have a large diameter. Secondly, said types of apparatus may produce great magnitudes of concentrated pressure against the central axle before utility is achieved, thereby possibly causing damage to the axle member. With the invention disclosed herein, however, utility is achieved without involving the central axle of a vehicle and without the application of pressure on any part of the vehicle except the wheel itself.

SUMMARY OF THE INVENTION

The subject of this invention is a dislodging tool for dislodging a mounted wheel from a drum of a vehicle, said tool comprising:

a. a base member having one end internally threaded to be threadably engageable and rotatable on a drum stud projecting through a stud hole of a wheel mounted on said drum;

b. a collar member having at least one ear element extending laterally therefrom, said collar member being slideable onto the base member and retainable thereon; and c. a bar member for each ear element of the collar member, said bar member being passable through an opening in a mounted wheel and having at one end thereof hook means to engage the outer lip of the inside surface of said mounted wheel, with said bar member being mountable on the ear element via mounting means.

In a preferred embodiment the base member is cylindrically shaped and of an outside diameter which is less than the diameter of the stud hole of the wheel, thereby permitting the wall of the stud hole to pass around the base member on removal of the wheel. The collar member preferably has two ear elements extending laterally and disposed opposite each other. Hook means of the bar member is preferably the shaping of one end of said bar member to form a hook. The preferred material for constructing the tool is case hardened steel as known in the art.

In applicant's copending patent application Ser. No. 06/111,028, filed Jan. 10, 1980, and entitled "Wheel Mounting Tool," is disclosed a tool which can be used in mounting a wheel on a drum of a vehicle. This mounting tool is further disclosed herein in conjunction with the instant dislodging tool to yield a dislodging and dismounting tool for dislodging and dismounting a mounted wheel from a drum of a vehicle, said tool comprising:

a. a cylindrically shaped base member whose first end is internally threaded to be threadably engageable and rotatable on a drum stud projecting through a stud hole of a wheel mounted on said drum and whose second end has attachment means for securing a wheel dismounting member, with said base member having an outside diameter less than the inside diameter of the stud hole of the wheel;

b. a collar member having at least one ear element extending laterally therefrom, said collar member being slideable onto the base member and retainable thereon;

c. a bar member for each ear element of the collar member, said bar member being passable through an opening in a mounted wheel and having at one end thereof hook means to engage the outer lip of the inside surface of said mounted wheel, with said bar member being mountable on the ear element via mounting means; and d. a wheel dismounting member comprising a rod having at least two horizontal portions at 0° from a horizontal plane and having one angular portion disposed between each two horizontal portions, said angular portion being disposed at an angle greater than 0° and less than about 50° from each adjacent horizontal portion, said rod having a first end and a second end, said first end having attachment means which are complimentary to the attachment means of the base member for attaching said dismounting member to said base member.

DETAILED DESCRIPTION OF PREFERRED EMBODIMENTS

Figure 1:
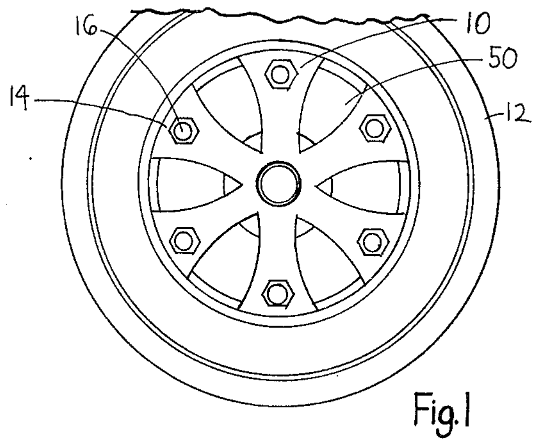
FIG. 1 is a side elevational view of a truck wheel with tire mounted thereon.
Figure 2:
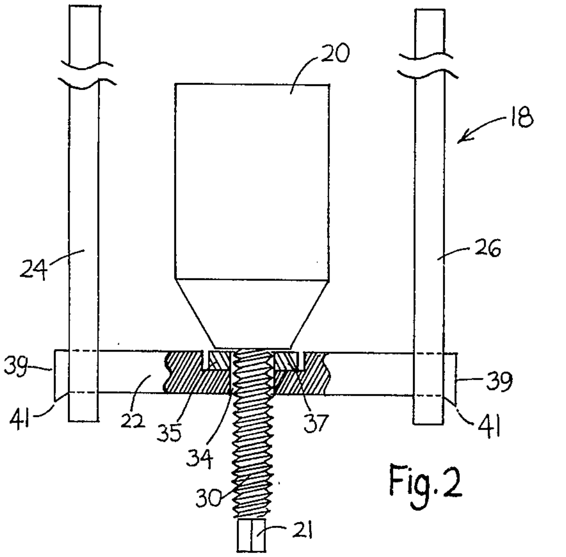
FIG. 2 is a top plan view of a dislodging tool for dislodging a mounted wheel from a drum of a vehicle.
Figure 3:
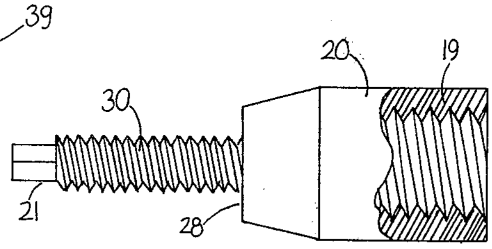
FIG. 3 is a side elevational view partially in section of the base member of the tool of FIG. 2.

Referring to FIG. 1, a truck wheel 10 with tire 12 mounted thereon is shown. The wheel 10 is secured to a vehicle drum with stud nuts 14 threaded on studs 16 as known in the art. As earlier related, wheels such as that illustrated in FIG. 1 become lodged or "frozen" against the drum of a vehicle due to road debris and are then very difficult to dislodge because of the bond formed. Therefore, as shown in FIG. 2, a wheel dislodging tool 18 is here disclosed for use in such dislodging operation. The elements of the tool 18 comprise a base member 20, a collar member 22, and two bar members 24, 26. As shown in FIG. 3, one end 19 of the base member 20 is internally threaded to be threadably engageable onto a drum stud such as a stud 16 as shown in FIG. 1. The other end 21 of the base member 20 is shaped to receive a wrench for forceable rotation of said base member 20. In the embodiment here illustrated the base member 20 is cylindrically shaped, is shaped along its body to form a ledge 28, has an outside diameter which is less than the inside diameter of a stud hole in a wheel, and possesses attachment means consisting of an externally threaded shaft 30 at its end 21 which will be described later.

Figure 4:
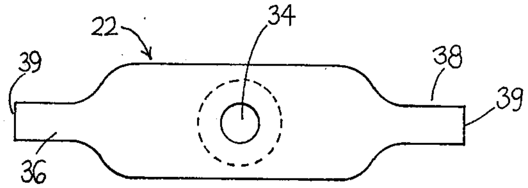
FIG. 4 is a front elevational view of the collar member of the tool of FIG. 2.
Figure 6:
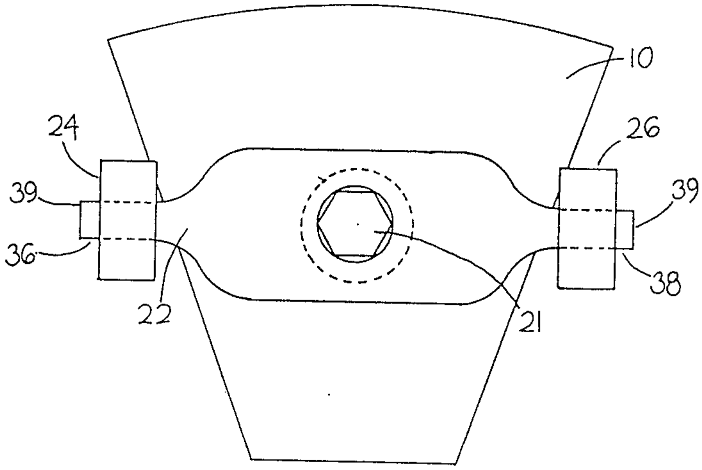
FIG. 6 is an enlarged front elevational view of the tool of FIG. 2 in place at a vehicle wheel.

As shown in FIGS. 2, 4, and 6, a collar member 22 is provided which slides on the base member 20. In the embodiment illustrated, the central orifice 34 of said collar member 22 is provided at its leading end with a shelf depression 35 in which a washer 37 is seated. The diameter of the orifice of the washer 37 corresponds to fit over the shaft 30. Should a base member having a shaft of greater diameter be required for a particular wheel, an operator need only change the washer to one having an appropriately-sized orifice to thereby make the collar member 22 usable on said larger base member. The collar member 22 is slid to the ledge 28 where said member 22 is retained. Of course, a collar member without a shelf depression 35 and washer 37 will have utility so long as the orifice 34 is appropriately sized. Extending laterally from the collar member 22 and disposed opposite each other are two ear elements 36, 38, each having a cube-shaped rectangular tongue 39 with a projection 41.

Figure 5:
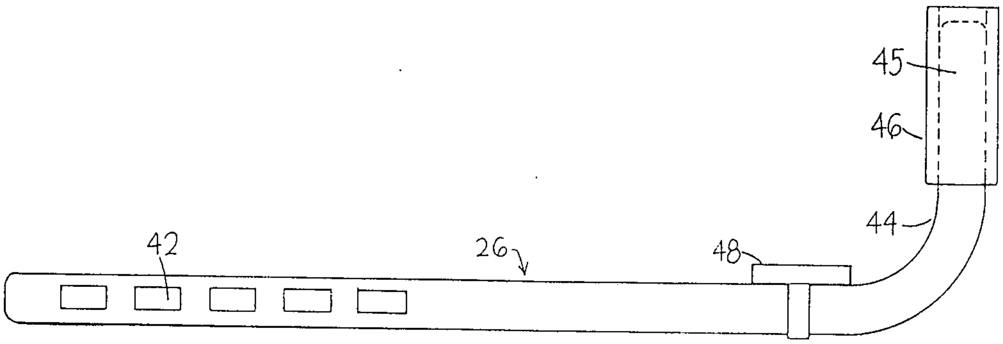
FIG. 5 is a side elevational view of the bar member of the tool of FIG. 2.

As illustrated in FIGS. 2 and 5, two identical bar members 24, 26, one for each ear element 36, 38 and one 26 of which is shown in FIG. 5, are mountable on said ear elements 36, 38. Such mountability is accomplished via selectable complimentary cube-shaped tongue receiving openings 42 in each bar member 26 to permit mounting as shown in FIG. 2. The bar member in the preferred embodiment is shaped at its end 44 to form a hook 45 which can be provided with a covering such as a rubber sleeve 46 to prevent the possibility of any damage to a wheel rim. A magnet 48 can be mounted to the bar member near its hook. An additional hook means can be provided along the body of the bar member should simultaneous dislodging of two adjacent parallel wheels such as those on truck-trailers be desired. Such additional hook means can comprise a hinged arm which folds on the bar member when not in use, but which can be positioned via the hinge to be perpendicular to the bar member to thereby provide said bar member with a second hook.

Operation of the wheel dislodging tool 18 is accomplished in the following manner, with reference to be made as appropriate to FIGS. 1-6. After removal of all stud nuts 14 from the studs 16, one of the studs 16 is chosen for attachment of the dislodging tool 18. The base member 20 is threaded onto the stud 16, the collar member 22 is slid onto the base member 20 until stopped by the ledge 28 and is positioned so the ear elements 36, 38 are aligned with openings 50 in the mounted wheel 10. Each bar member 24, 26 is passed through openings 50 and arranged so the hook 45 engages the outer lip of the inside surface of the mounted wheel while the cube-shaped openings 42 in each bar member are near respective ear elements 36, 38. When the hook 45 is so arranged, each bar member 24, 26 is mounted to the collar 22 via placement of the nearest tongue-receiving opening 42 around the cube-shaped tongue 39 of the respective ear element. The backward projection 41 of the tongue 39 prevents lateral slipping on said tongue of the mounted bar members. If desired, a magnet 48 can be mounted on the bar member near the hook 45 to aid in placement of each bar member by being attracted and held to the metal wheel. After each bar member is in place and mounted on the respective ear elements 36, 38, an operator merely places a wrench on the end 21 of the base member 20 and rotates said base member counter-clockwise. Such action, of course, moves the base member 20 away from the wheel and also moves the collar member 22 away from the wheel. Such movement of the collar member 22 causes the bar members with placed hooks 45 to pull the wheel from its drum, thereby breaking the seal between wheel and drum. As is evident, only a slight rotation is required since the wheel need only be moved a small distance to break the interface seal. Occasionally, depending on the severity of the interface seal, it may be necessary to use as described the dislodging tool 18 at additional stud locations to free the wheel.

Figure 7:
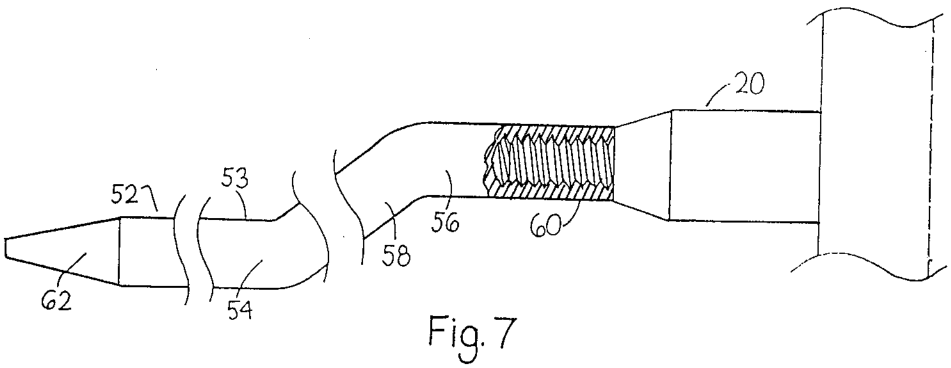
FIG. 7 is a side elevational view of the tool of FIG. 2 and having attached thereto apparatus partially in section for wheel dismounting.

After the seal is broken, an operator removes the bar members 24, 26 and collar member 22. The operator may then remove the base member 20 and proceed with conventional removal of the wheel. Conversely, the operator may only remove the bar members and collar member and then employ a wheel dismounting member 52 as shown in FIG. 7. This apparatus is the subject of applicant's copending patent application above-referenced and incorporated herein br reference. In the preferred embodiment shown, the dismounting member 52 comprises a rod 53 having two horizontal portions 54, 56 at 0° from a horizontal plane. One angular portion 58 is disposed between the two horizontal portions 54, 56 at an angle of 22.5° from each adjacent horizontal portion. The rod 53 has a first end 60, partially broken away in FIG. 7, and a second end 62, said second end 62 being shown as terminating in a point. The first end 60 is internally threaded as shown to be threadably engageable with the externally threaded shaft 30 of the base member 20. When the dismounting member 52 is so attached, an operator can conveniently slide the wheel from the drum by permitting the wall of the stud hole of said wheel to ride on said dismounting member 52.

As earlier related, the several members of this invention are preferably constructed of case hardened steel as known in the art so that durable utility can be realized. Of course, other materials can be chosen so long as utility is maintained. While the above described embodiments illustrate the inventive principles herein recited, said embodiments are to be understood as being illustrative only and not limiting the scope of the invention which is defined in the claims which follow.

What is claimed is:

1. A dislodging and dismounting tool for dislodging and dismounting a mounted wheel from a drum of a vehicle, said tool comprising:

a. a cylindrically shaped base member whose first end is internally threaded to be threadably engageable and rotatable on a drum stud projecting through a stud hole of a wheel mounted on said drum and whose second end has attachment means for securing a wheel dismounting member, with said base member having an outside diameter less than the inside diameter of the stud hole of the wheel;

b. a collar member having at least one ear element extending laterally therefrom, said collar member being slideable onto the base member and retainable thereon;

c. a bar member for each ear element of the collar member, said bar member being passable through an opening in a mounted wheel and having at one end thereof hook means to engage the outer lip of the inside surface of said mounted wheel, with said bar member being mountable on the ear element via mounting means; and d. a wheel dismounting member comprising a rod having at least two horizontal portions at 0° from a horizontal plane and having one angular portion disposed between each two horizontal portions, said angular portion being disposed at an angle greater than 0° and less than about 50° from each adjacent horizontal portion, said rod having a first end and a second end, said first end having attachment means which are complimentary to the attachment means of the base member for attaching said dismounting member to said base member.

2. A dislodging tool for dislodging a mounted wheel from a drum of a vehicle, said tool comprising:

a. a base member having one end internally threaded to be threadably engageable and rotatable on a drum stud projecting through a stud hole of a wheel mounted on said drum;

b. a collar member having at least one ear element extending laterally therefrom, said collar member being slideable onto the base member and retainable thereon; and c. a bar member for each ear element of the collar member, said bar member being passable through an opening in a mounted wheel and having at one end thereof hook means of engage the outer lip of the inside surface of said mounted wheel, with said bar member being mountable on the ear element via mounting means, and further with said bar member having a magnet mounted thereon near the hook means.

3. A dislodging tool for dislodging a mounted wheel from a drum of a vehicle, said tool comprising:

a. a base member having one end internally threaded to be threadably engageable and rotatable on a drum stud projecting through a stud hole of a wheel mounted on said drum;

b. a collar member having at least one ear element extending laterally therefrom, said collar member being slideable onto the base member and retainable thereon; and c. a bar member for each ear element of the collar member, said bar member being passable through an opening in a mounted wheel and having at one end thereof hook means to engage the outer lip of the inside surface of said mounted wheel, with said bar member being mountable on the ear element via mounting means, said mounting means comprising a shaped tongue extending from the ear member and multiple complimentarily-shaped tongue-receiving openings through the bar member, said receiving openings positioned along a portion of the bar member to provide mounting sites for mounting the bar member on the ear member.

* * * * *